(12) United States Patent
Shi et al.

(10) Patent No.: US 8,982,584 B2
(45) Date of Patent: Mar. 17, 2015

(54) POWER SUPPLY REGULATION FOR ULTRA-LOW LOAD AND NO-LOAD OPERATION

(71) Applicant: iWatt Inc., Campbell, CA (US)

(72) Inventors: Fuqiang Shi, Oak Park, IL (US); Yong Li, San Jose, CA (US); John William Kesterson, Seaside, CA (US); David Nguyen, Santa Clara, CA (US)

(73) Assignee: Dialog Semiconductor Inc., Campbell, CA (US)

( * ) Notice: Subject to any disclaimer, the term of this patent is extended or adjusted under 35 U.S.C. 154(b) by 218 days.

(21) Appl. No.: 13/660,950

(22) Filed: Oct. 25, 2012

(65) Prior Publication Data

US 2013/0121032 A1 May 16, 2013

Related U.S. Application Data

(60) Provisional application No. 61/560,039, filed on Nov. 15, 2011.

(51) Int. Cl.
*H02M 3/335* (2006.01)
*H02M 1/00* (2006.01)

(52) U.S. Cl.
CPC ............ *H02M 3/33507* (2013.01); *Y02B 70/16* (2013.01); *H02M 2001/0032* (2013.01)
USPC ..................................................... 363/21.12

(58) Field of Classification Search
USPC ........................................... 363/21.08–21.18
See application file for complete search history.

(56) References Cited

U.S. PATENT DOCUMENTS

| 5,657,215 A | 8/1997 | Faulk |
| 5,805,434 A | 9/1998 | Vinciarelli et al. |

(Continued)

FOREIGN PATENT DOCUMENTS

| CN | 2051800 U | 1/1990 |
| CN | 101283325 A | 10/2008 |

(Continued)

OTHER PUBLICATIONS

Korean Intellectual Property Office, Office Action, Korean Patent Application No. 10-2012-0129273, Oct. 16, 2013, four pages.
State Intellectual Property Office of the People's Republic of China, First Office Action, Chinese Patent Application No. 201210478585.9, Aug. 4, 2014, twenty-three pages.

*Primary Examiner* — Jue Zhang
(74) *Attorney, Agent, or Firm* — Fenwick & West LLP

(57) ABSTRACT

A controller of a switching power converter employs a dynamically adaptive power supply regulation approach that improves low-load and no-load regulation to achieve ultra-low standby power in a switching power converter. Under ultra-low load conditions when a deep-deep pulse width modulation (DDPWM) is applied, the controller decreases the actual on-time of the power switch of the switching power converter by decreasing the "on" duration of the control signal used to turn on or off the power switch, until the "on" duration of the control signal reaches a minimum value. To further reduce the on-time of the power switch, the controller reduces the power applied to the power switch to turn on the switch more slowly, while maintaining the "on" duration of the control signal at a minimum value. The minimum value of the "on" duration of the control signal and the minimum power applied to the switch are dynamically controlled.

36 Claims, 6 Drawing Sheets

(56) References Cited

U.S. PATENT DOCUMENTS

| | | |
|---|---|---|
| 6,304,464 B1 | 10/2001 | Jacobs et al. |
| 2009/0086513 A1* | 4/2009 | Lombardo et al. ......... 363/21.12 |
| 2010/0164455 A1 | 7/2010 | Li et al. |
| 2010/0165672 A1* | 7/2010 | Li et al. ..................... 363/21.16 |
| 2012/0081084 A1* | 4/2012 | Yang et al. ..................... 323/235 |

FOREIGN PATENT DOCUMENTS

| | | |
|---|---|---|
| JP | H08-289543 A | 11/1996 |
| JP | 2001-238441 A | 8/2001 |

* cited by examiner

US 8,982,584 B2

POWER SUPPLY REGULATION FOR ULTRA-LOW LOAD AND NO-LOAD OPERATION

CROSS REFERENCE TO RELATED APPLICATION

This application claims priority under 35 U.S.C. §119(e) from co-pending U.S. Provisional Patent Application No. 61/560,039, filed on Nov. 15, 2011, which is incorporated by reference herein in its entirety.

BACKGROUND

1. Technical Field

The present disclosure relates to controlling a switching power converter in more than one operation mode to increase the efficiency of the power converter at low-load or no-load conditions.

2. Description of the Related Arts

Increased efficiency demands placed on portable electronic devices create challenges for regulating power in low-load or no-load operation in a switching power converter. These challenges include consuming nearly no power in standby mode, while being able to quickly deliver power when the device is suddenly plugged-in.

In low-load or no-load operation, switching power converters operate at a low switching frequency represented by $F_{SW}$. On the other hand, low switching frequencies make it difficult to satisfy the demands of fast dynamic load response (DLR) in switching power converters. The impact of these competing requirements may be even more apparent in the operation of a flyback power converter with a primary-side feedback switching power converter. In a primary-side feedback flyback power converter, the primary voltage feedback responds to the load change cycle-by-cycle. To regulate the output voltage switching cycle-by-switching cycle, the primary feedback voltage is typically sampled once per switching cycle. If the switching frequency becomes too low, the resulting switching period may be too long to sample information between consecutive switching cycles and result in a distorted waveform of the output voltage. On the other hand, an increase in switching frequency results in a proportional undesirable increase in power supply consumption.

SUMMARY

Embodiments include a dynamically adaptive switching power supply with a regulation scheme that improves low-load and no-load regulation to achieve ultra-low standby power in a switching power converter. Under ultra-low load conditions when a deep-deep pulse width modulation (DDPWM) mode is used to control the switching power converter, as the input power to the switching power converter is decreased, the actual on-time of the power switch of the switching power converter is reduced by decreasing the "on" duration of the control signal used to turn on or off the power switch, until the "on" duration of the control signal reaches a minimum value. When the "on" duration of the control signal reaches the minimum value, the "on" duration is not reduced any further even with the input power further decreasing, but rather maintained at the minimum value. Instead, the actual on-time of the power switch is further reduced by making the power switch turn on more slowly, e.g., by reducing the base current provided by the switch driver if a bipolar transistor is used as the power switch, or by increasing the on-resistance of the switch driver if a power MOSFET is used as the power switch. Thus, the switching power converter can further reduce the actual on-time of the power switch without further reducing the "on" duration of the control signal used to turn on or off the power switch lower than the minimum value. This allows the switching power converter to operate under ultra-low load conditions delivering very low power responsive to very low input power, while maintaining appropriate waveforms of the output voltage of the switching power converter to allow appropriate sensing and regulation of the output voltage.

The minimum value of the "on" duration of the control signal used to turn on or off the power switch may be determined dynamically, when the switching power converter is in use, toggling between an initial value and another increased value. When a distorted output voltage sensing waveform of the switching power converter is detected during use of the switching power converter, the minimum value of the "on" duration of the control signal used to turn on or off the power switch is increased from the initial value to the increased value, and a timer may be set. When the timer reaches a predetermined limit and the waveform of the output voltage of the switching power converter is not distorted, the minimum value of the "on" duration of the control signal used to turn on or off the power switch is decreased back to the initial value. The minimum base current for driving a bipolar transistor or maximum on-resistance for driving a power MOSFET can be dynamically adjusted in the same way as the minimum value of the "on" duration as described above.

The features and advantages described in the specification are not all inclusive and, in particular, many additional features and advantages will be apparent to one of ordinary skill in the art in view of the drawings and specification. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present disclosure can be readily understood by considering the following detailed description in conjunction with the accompanying drawings.

DETAILED DESCRIPTION OF EMBODIMENTS

The Figures (FIG.) and the following description relate to preferred embodiments of the present disclosure by way of illustration only. It should be noted that from the following discussion, alternative embodiments of the structures and methods disclosed herein will be readily recognized as viable alternatives that may be employed without departing from the principles of the present disclosure.

Reference will now be made in detail to several embodiments of the present disclosure, examples of which are illustrated in the accompanying figures. It is noted that wherever practicable similar or like reference numbers may be used in the figures and may indicate similar or like functionality. The figures depict embodiments of the present disclosure for purposes of illustration only. One skilled in the art will readily recognize from the following description that alternative embodiments of the structures and methods illustrated herein may be employed without departing from the principles of the embodiments described herein.

Example Switching Power Converter Circuit

Figure 1:
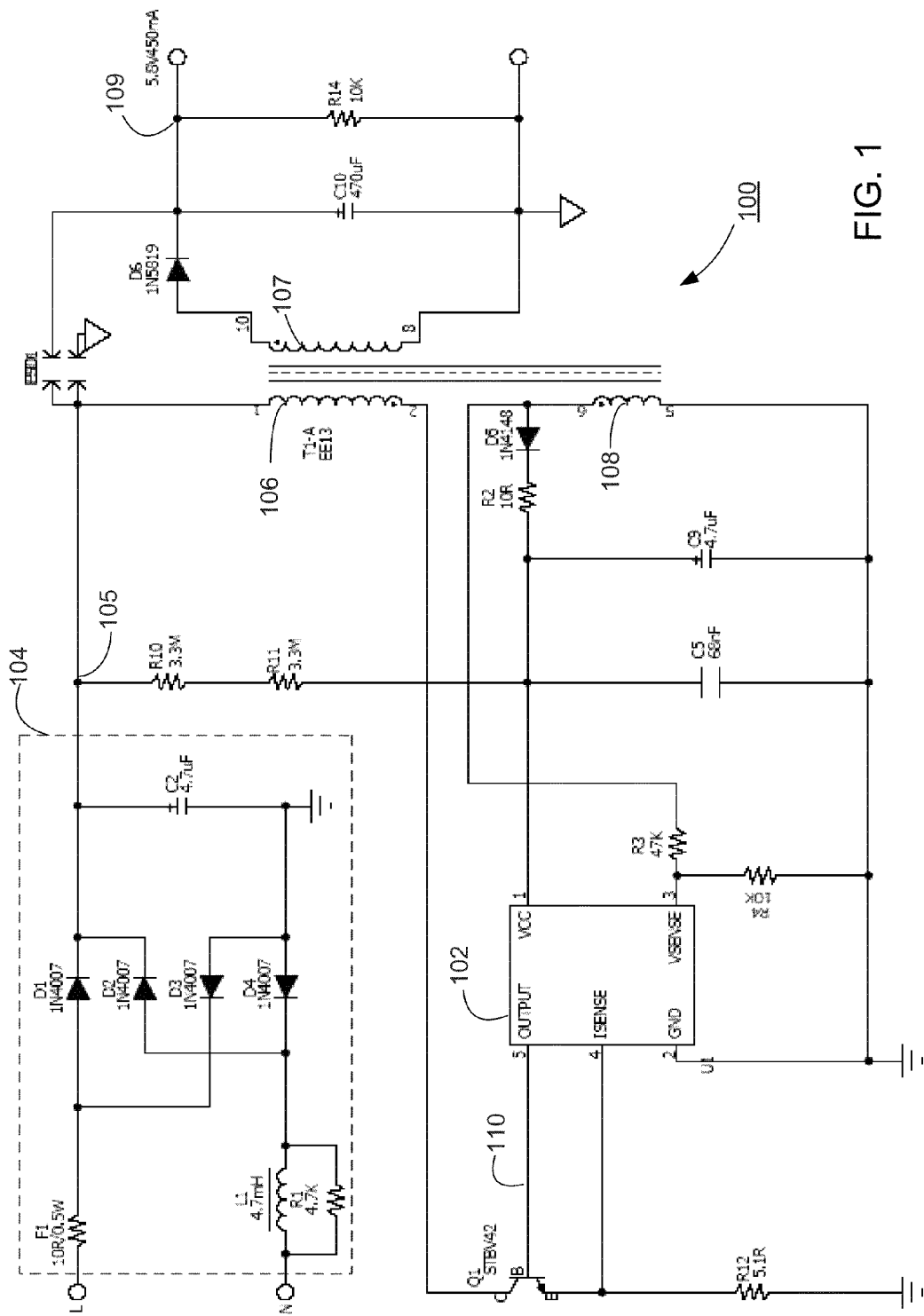
FIG. 1 is a circuit diagram illustrating a switching power converter, according to one embodiment.

FIG. 1 is a circuit diagram illustrating a switching power converter 100, according to one embodiment. Power converter 100 is a primary-side feedback flyback converter, and includes three principal sections, i.e., front end 104, power stage, and secondary stage. Front end 104 is connected to an AC voltage source (not shown) at nodes L, N, and includes a bridge rectifier comprised of inductor L1, resistors R1 and F1, diodes D1, D2, D3, and D4, and capacitor C2. The rectified input line voltage at node 105 is input to the supply voltage pin Vcc (pin 1) of controller IC 102 via resistors R10 and R11. The line voltage at node 105 is also connected to the primary winding 106 of power transformer T1-A. Capacitor C5 removes high frequency noise from the rectified line voltage. The output of front end 104 at node 105 is an unregulated DC input voltage.

The power stage is comprised of power transformer T1-A, BJT power switch Q1, and controller IC 102. Power transformer T1-A includes primary winding 106, secondary winding 107, and auxiliary winding 108. Controller IC 102 maintains output regulation via control of the ON and OFF states of BJT power switch Q1. The ON and OFF states of BJT power switch Q1 are controlled via control signal 110 output from the OUTPUT pin (pin 5) of controller IC 102. Control signal 110 drives the base (B) of BJT power switch Q1. The collector (C) of BJT power switch Q1 is connected to the primary winding 106, while the emitter (E) of BJT power switch Q1 is connected to the $I_{SENSE}$ pin (pin 4) of controller IC 102 and to ground via resistor R12. $I_{SENSE}$ pin senses the current through the primary winding 106 and BJT switch Q1 in the form of a voltage across sense resistor R12. Controller IC 102 employs the modulation technique as described below in detail with reference to FIGS. 3A-3E to control the ON and OFF states of power switch Q1, the duty cycles of control signal 110 and the amplitude of the BJT base current. The GND pin (pin 2) of controller IC 102 is connected to ground. While a BJT switch Q1 is used as the power switch in the embodiment of FIG. 1, a power MOSFET may also be used as the power switch for the switching power converter 100 according to other embodiments herein.

The secondary stage is comprised of diode D6 functioning as an output rectifier and capacitor C10 functioning as an output filter. The resulting regulated output voltage Vout at node 109 is delivered to the load (not shown) and a pre-load R14. The pre-load R14 stabilizes the output of the power converter at no load conditions. Also, ESD (Electrostatic Discharge) gap (ESDI) is coupled between primary winding 106 and diode D6.

The output voltage Vout at node 109 is reflected across auxiliary winding 108, which is input to the $V_{SENSE}$ pin (pin 3) of controller IC 102 via a resistive voltage divider comprised of resistors R3 and R4. Also, although controller IC 102 is powered up by the line voltage 105 at start-up, controller IC 102 is powered up by the voltage across auxiliary winding 108 after start-up and in normal operation. Thus, diode D5 and resistor R2 form a rectifier for rectifying the voltage across auxiliary winding 108 for use as the supply voltage input to the $V_{CC}$ pin (pin 1) of controller IC 102 after start-up during normal operation. Capacitor C9 is used to hold power from the line voltage at node 105 at start-up or from the voltage across auxiliary winding 108 after start-up between switching cycles.

Figure 2:
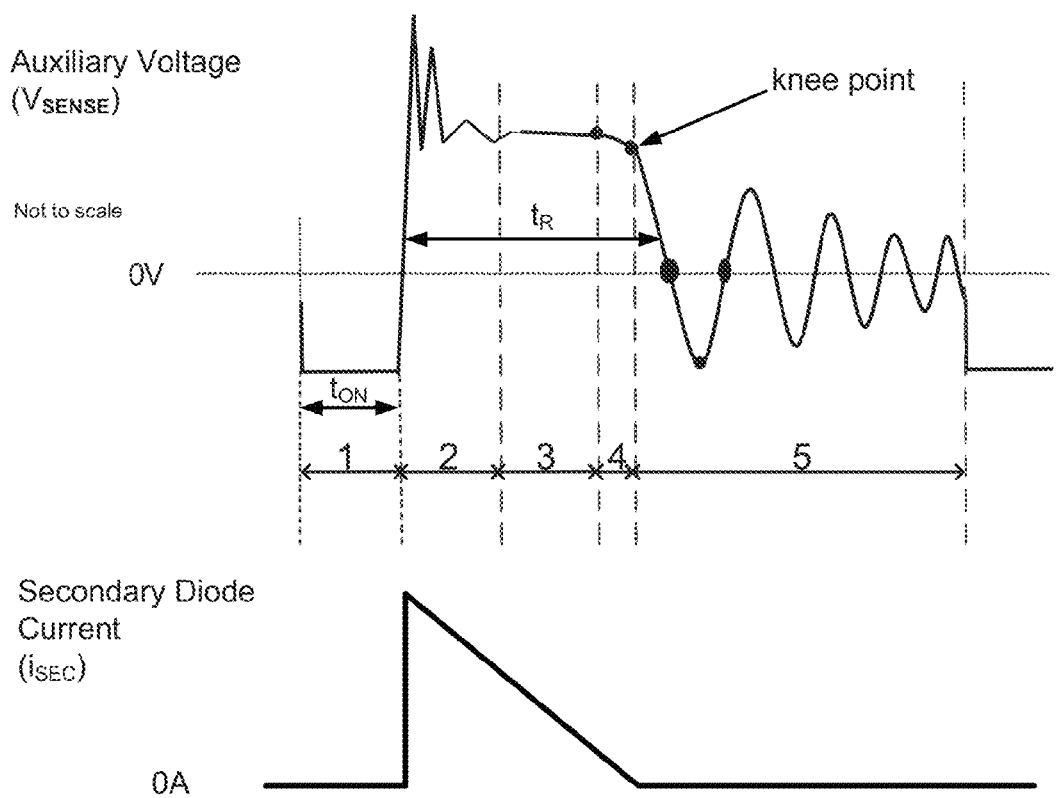
FIG. 2 illustrates the operation of the switching power converter of FIG. 1 according to one embodiment.

FIG. 2 illustrates an exemplary auxiliary winding voltage waveform ($V_{SENSE}$) segmented by states associated with the operation of the primary side feedback flyback power converter. The auxiliary winding voltage reflects the secondary winding voltage and is used for sensing the output voltage in primary side feedback flyback power converters. Referring to FIGS. 1 and 2 together, in state 1, the power transistor (Q1) turns on, which is represented by the actual turn-on time ($t_{ON}$) of the power switch. In state 2, the power switch (Q1) is turned off, the secondary current ($i_{SEC}$) in the output diode (D6) starts conducting, and ringing on the output voltage occurs due to the leakage inductance and the parasitic capacitance of the power switch. In state 3, the output voltage drops due to the IR drop across the diode (D6) and the equivalent series resistance (ESR) of the output capacitor (C10). The magnitude of the voltage drop in state 3 is primarily a function of the rate of change of the secondary current ($i_{SEC}$), which is relatively constant. In state 4, the secondary current ($i_{SEC}$) approaches zero and the voltage drop across the secondary diode (D6) decreases. And in state 5, oscillation of the output voltage occurs between the magnetizing inductance of the transformer T1 and parasitic capacitance of the power switch Q1. To properly regulate the output voltage, the $V_{SENSE}$ waveform should have a knee point that accurately reflects the output voltage, which typically occurs when the secondary current ($i_{SEC}$) reaches zero (i.e., when the output diode D6 stops conducting). In cases where the power transistor actual "on time" ($t_{ON}$) is too small, the power transistor Q1 may not be fully turned on or the energy delivered to the output may be too small. Consequently, the auxiliary winding waveform ($V_{SENSE}$) may become distorted and fail to accurately reflect the output voltage.

On other hand, in order to achieve very low power under low-load and no-load operating conditions, and maintain a relatively high switching frequency, it is desired to have very short actual "on time" for power switch Q1, such as 100 ns. Depending on the switching speed of the power transistor, however, the transistor may not always be able to achieve a good $V_{SENSE}$ waveform for regulation when the power switch is driven by a control signal with too short an on-time. In one embodiment, to avoid the $V_{SENSE}$ distortion caused by too short "on time" of the control signal used to turn on or off the power switch, a minimum "on time" ($T_{ON\_MIN}$) may be set to generate $V_{SENSE}$ waveform suitable for accurate sensing and regulation. Factors including line voltage and the power transistor type may be taken into consideration to determine the minimum on-time $T_{ON\_MIN}$ of the control signal used to turn on or off the power switch. Furthermore, the determination of $T_{ON\_MIN}$ is made dynamically, according to the embodiments herein as explained in more detail below. For example, at a high line voltage (input voltage), e.g. 230 V, $T_{ON\_MIN}$ of 150 ns may be sufficient to generate a $V_{SENSE}$ waveform suitable for accurate sensing, while at a low line voltage (input voltage), e.g. 90 V, $T_{ON\_MIN}$ of 800 ns may be needed in order to generate a suitable $V_{SENSE}$ waveform. Additionally, for a fast MOSFET used as the power switch, $T_{ON\_MIN}$ of 120 ns at a line voltage of 230 V may be sufficient to generate a $V_{SENSE}$ waveform suitable for accurate sensing, while for a slow MOSFET used as the power switch, $T_{ON\_MIN}$ of 200 ns at a line voltage 230 V may be appropriate.

Adaptive Mode Transition

Figure 3A:
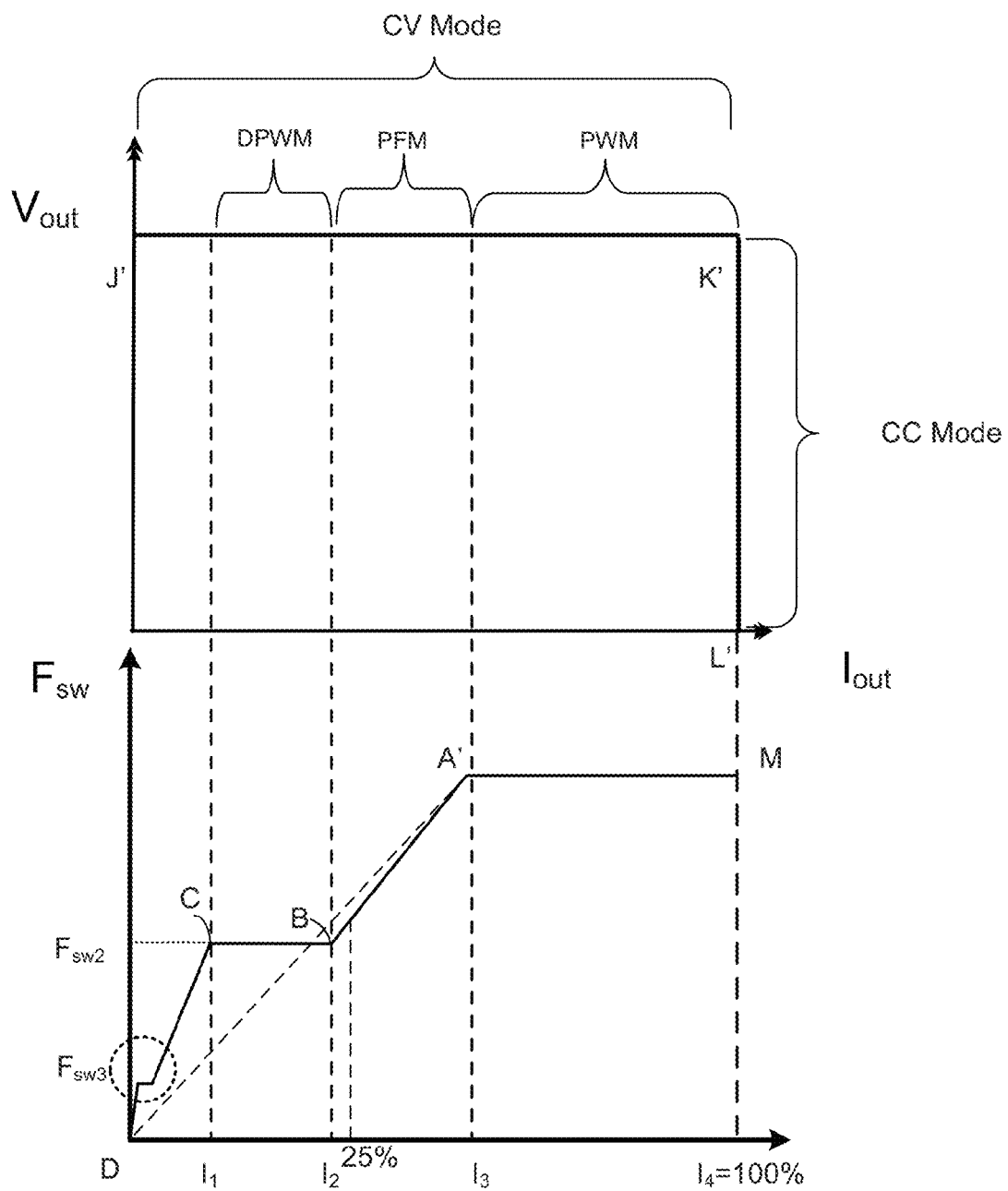
FIG. 3A is a graph illustrating the operation modes of a switching power converter, according to one embodiment.

FIG. 3A is a graph illustrating the operation of switching power converter 100, according to one embodiment. Line J'-K' represents the operation of switching power converter 100 in constant voltage (CV) mode. Line K'-L' represents the operation of switching power converter 100 in constant current (CC) mode.

In one embodiment, switching power converter 100 operates in modes as indicated by lines M-A', A'-B, B-C, and C-D. In high load conditions represented as a straight line M-A', switching power converter 100 operates in first PWM mode to generate an output current Iout in the range above $I_3$ up to the maximum output current $I_4$. If the output current Iout drops below $I_3$, the power converter transitions from first PWM mode (represented by line M-A') to first PFM mode (represented by line A'-B) followed by second PWM mode (hereinafter referred to as 'deep' PWM or DPWM, represented by line B-C) which is again followed by second PFM mode (hereinafter referred to as 'deep' PFM or DPFM, represented by line C-D). Contrast this with conventional power converters where a single PFM mode represented by line A'-D is used throughout the output current level below $I_3$.

More specifically, as the output current Iout of switching power converter 100 drops to $I_3$, switching power converter 100 switches to PFM mode represented by line A'-B. Worldwide energy standards specify the average efficiency of the power converter based on the averaging of the efficiencies at four loading points (25% load, 50% load, 75% load, and 100% load). In order to satisfy such standards, it is advantageous to set $I_3$ at a level substantially higher than 25% of the maximum load so that switching power converter 100 operates in PFM mode around the 25% load level. In one embodiment, $I_3$ is set around 50% of the maximum output current $I_4$.

If the output current of switching power converter 100 drops further to $I_2$, switching power converter 100 transitions to DPWM mode where the duty cycle of the switch is controlled by adjusting the duration of on-times of the switch in each switching cycle, as in any PWM mode. During DPWM mode, the switching frequency is maintained at $F_{SW2}$, which is higher than the audible frequency range. In one embodiment, the $F_{SW2}$ is around 20 kHz, which is higher than the audible frequency range. Switching power converter 100 operates in DPWM mode as represented by line B-C where switching power converter 100 generates an output current Iout between $I_1$ and $I_2$. In one embodiment, $I_1$ and $I_2$ are set around 5% and 20% of the maximum output current $I_4$, respectively.

PWM Mode Operation in Light Load Conditions

In another embodiment, switching power converter 100 operates in a third PWM mode (hereinafter referred to as 'deep-deep PWM' or DDPWM) in very-light-load or no-load conditions to improve dynamic load response. When the load across the output of switching power converter 100 is abruptly increased (e.g., by initially connecting switching power converter 100 to an external output load while switching power converter 100 is in a low-load or no-load condition), the output voltage of switching power converter 100 may drop below a permissible level and also take an extended amount of time to recover back to the regulated output voltage due to low switching frequency in the low-load conditions. To enhance dynamic output regulation performance at the low-load or no-load conditions, switching power converter 100 according to one embodiment switches to operate in DDPWM mode at a predetermined switching frequency and then transitions to DDPFM mode or a third PFM mode (hereinafter referred to as referred to as 'deep-deep PFM' or DDPFM) as the load across the output of switching power converter 100 is decreased.

Figure 3B:
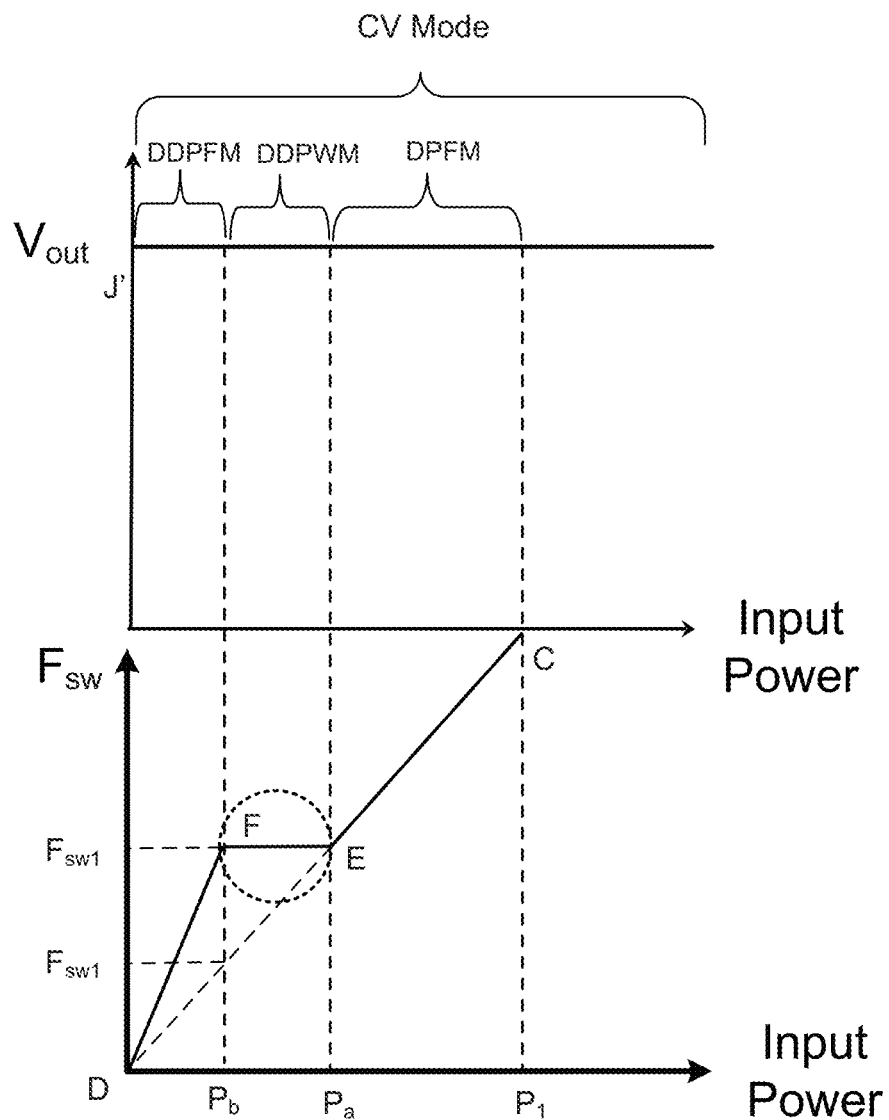
FIG. 3B is graph illustrating the operation modes of FIG. 3A at low-load and no-load conditions, according to one embodiment.

FIG. 3B is a graph illustrating the operation modes of switching power converter 100 implementing DDPWM and DDPFM modes, according to one embodiment. FIG. 3B illustrates the region delineated by the dotted circle in FIG. 3A in more detail. The operation of switching power converter 100 above output current level $I_1$ (FIG. 3A) is essentially the same as the embodiment described above with reference to FIG. 3A, and therefore, the detailed description thereof is omitted herein for the sake of brevity. In this embodiment, switching power converter 100 operates in two additional modes (DDPWM mode and DDPFM mode) at low-load and no-load conditions where the output current Iout is below level $I_1$ ($I_1$ in FIG. 3A corresponding to input power level $P_1$ in FIG. 3B) instead of operating in a single DPFM mode throughout these conditions.

In a scenario where the input power of switching power converter 100 is gradually decreased below $P_1$ ($P_1$ corresponds to the input power consumption of switching power consumption converter 100 when output current of switching power converter 100 is $I_1$ as illustrated in FIG. 3A), switching power converter 100 operates in DPFM mode represented by line C-E, as in the PFM mode. For example, $P_1$ may be about 2% of the maximum input power consumption of switching power converter 100. When the input power of switching power converter 100 drops to $P_a$, switching power converter 100 transitions and operates in DDPWM mode represented by the circled line E-F. Then, switching power converter 100 transitions and operates again in DDPFM mode when the input power of switching power converter 100 drops below $P_b$, as represented by line F-D.

Figure 3C:
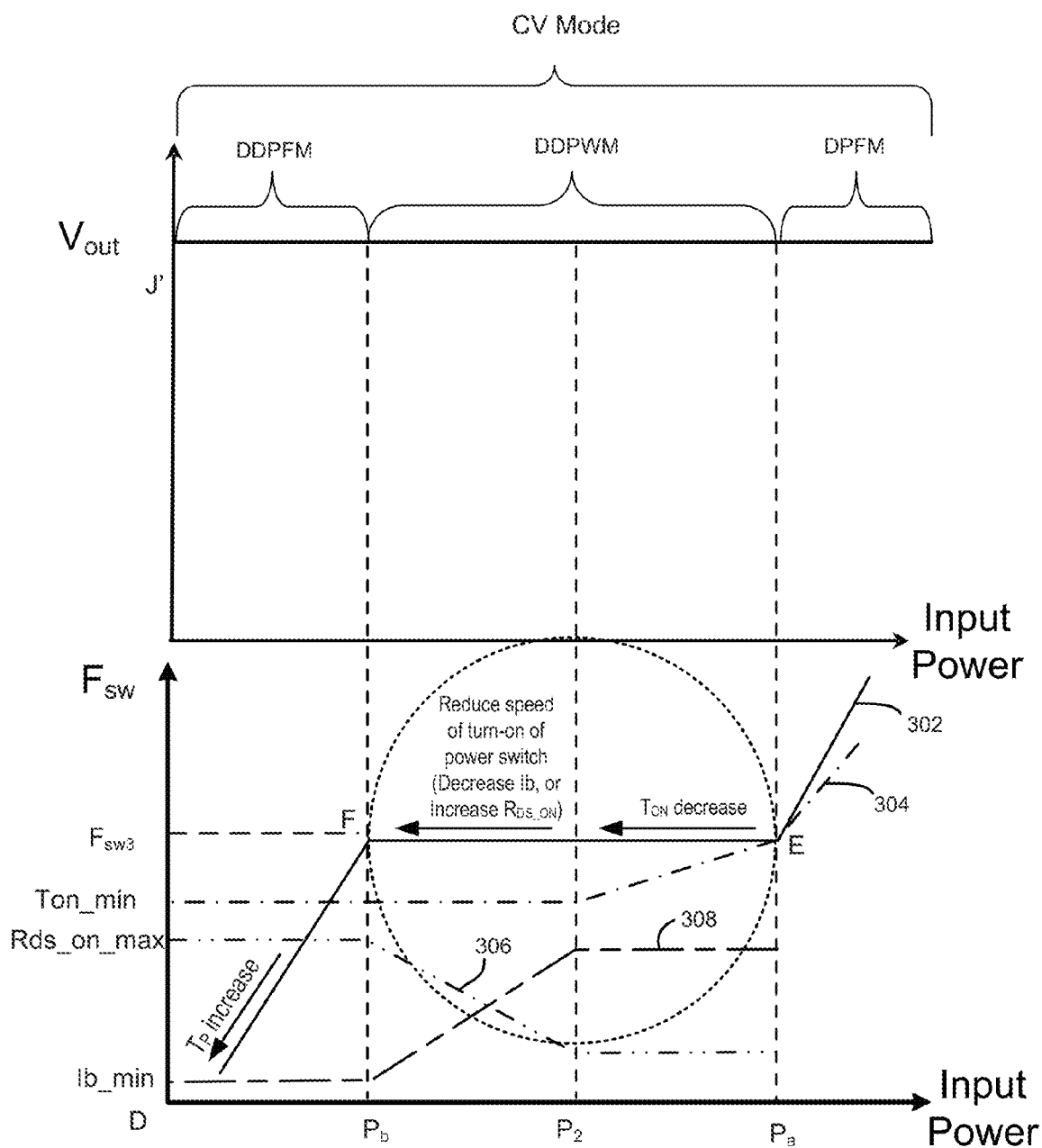
FIG. 3C is a graph illustrating the operation modes of FIG. 3B at low-load and no-load conditions in more detail, according to one embodiment.

FIG. 3C is a graph illustrating the DDPWM operation mode in more detail, according to another embodiment. Curve 302 indicates the switching frequency of switching power converter 100, curve 304 indicates the duration of the on-time ($T_{ON}$) of control signal 110 turning on or off the power switch of switching power converter 100 in a switching cycle, curve 306 indicates the on-resistance ($R_{DS\_ON}$) of the driver of the power switch of switching power converter 100 when a power MOSFET is used as the power switch, and curve 308 indicates the base current provided by the driver of the power switch of switching power converter of 100 when a bipolar transistor is used as the power switch.

In one embodiment, the circled line E-F normally corresponds to no-load operation during which the input of switching power converter 100 is connected to a power source but the output of switching power converter 100 is not connected to any load. In no-load conditions, the actual output current of switching power converter 100 is zero or close to zero but the input power is not zero due to power consumption by switching power converter 100. $P_a$ and $P_b$ represent a level of the input power consumption of switching power converter 100. For example, $P_a$ may be about 1% of the maximum input power consumption of switching power converter 100. In another example, $P_b$ may be less than about 0.5% of the maximum input power consumption of switching power converter 100. Note that the horizontal axis of FIGS. 3B and 3C represents input power of switching power converter 100 (unlike FIG. 3A where the horizontal axis represents output current of switching power converter 100). As the load decreases, the power consumed by switching power converter 100 becomes more dominant compared to the power consumed by the load, and can no longer be disregarded. Therefore, in FIGS. 3B and 3C, the reference points $P_a$ and $P_b$ are indicated as a fraction of the maximum input power of switching power converter 100 instead of the maximum output current of switching power converter 100.

Returning to FIG. 3C, DDPWM mode may be divided into two control regions, $T_{ON}$ control region and $R_{DS\_ON}$ control region. In the $T_{ON}$ control region between input power $P_a$ and $P_2$, switching power converter 100 operates in DDPWM mode but controls the actual on-time of the power switch of switching power converter 100 by controlling the duration ($T_{ON}$) of control signal 110 directly and reducing $T_{ON}$ as the input power is decreased. When $T_{ON}$ reaches $T_{ON\_min}$, switching power converter 100 does not further reduce the on-duration ($T_{ON}$) of control signal 100 despite the input power decreasing further beyond $P_2$, but rather maintains $T_{ON}$ at $T_{ON\_min}$. Instead, when the input power further decreases beyond $P_2$, switching power converter 100 decreases the actual on-time of the power switch of switching power converter 100 by turning on the power switch more slowly, i.e., by decreasing the base current (Ib) provided by the driver driving the power switch if a BJT power switch is used in the power converter 100, or by increasing the on-resistance ($R_{DS\_ON}$) of the driver if a power MOSFET power switch is used in switching power converter 100. Thus, if the power switch of switching power converter 100 is a BJT, the base current (Ib) provided by the driver driving the BJT power switch is constant between input powers $P_a$ and $P_2$, but is decreased between input powers $P_2$ and $P_b$ as the input power is decreased, until it reaches its minimum value, $Ib_{min}$, at $P_b$ as shown by curve 308. On the other hand, if the power switch of switching power converter 100 is a power MOSFET, the on-resistance ($R_{DS\_ON}$) of the driver driving the power MOSFET is constant between input powers $P_a$ and $P_2$, but is increased between input powers $P_2$ and $P_b$ as the input power is decreased, until it reaches its maximum value, $R_{DS\_ON\_max}$, at $P_b$ as shown by curve 304. Because the power switch is turned on more slowly as the input power is decreased from $P_2$ to $P_b$, the actual on-time of the power switch (i.e., the actual duration while the power switch is in an on-state at each switching cycle) is decreased and less power is delivered by switching power converter 100 to the load, thereby appropriately responding to the decreasing input power to switching power converter 100.

Figure 3D:
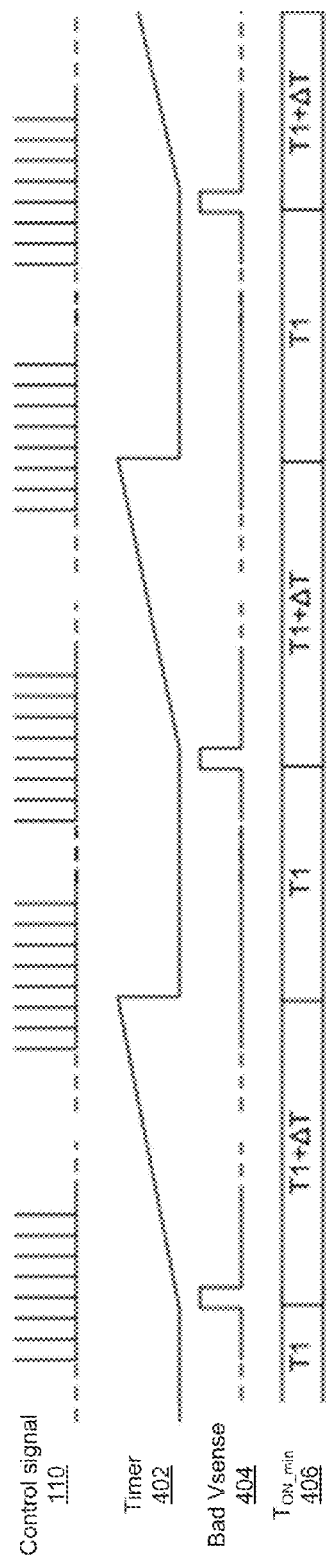
FIG. 3D illustrates how the minimum $T_{ON\_min}$ is set, according to one embodiment.

In one embodiment, $T_{ON\_min}$, $R_{DS\_ON\_max}$, or $Ib_{min}$ are determined dynamically in operation, such that the circuit parameters of switching power converter 100 as well as the operating condition of switching power converter 100 are taken into consideration when determining which values to use for $T_{ON\_min}$, $R_{DS\_ON\_max}$, or $Ib_{min}$. FIG. 3D illustrates an exemplary control algorithm for $T_{ON\_min}$ control. Referring to FIG. 3D together with FIG. 1, the pulse train illustrates a series of pulses output from controller IC 102 as control signal 110 to provide a switching input to the power transistor Q1. Bad $V_{SENSE}$ signal 404 is a signal indicating whether the $V_{SENSE}$ waveform is distorted (i.e. Bad $V_{SENSE}$ is high) or not, due to the duration of the on-time of the pulses in the pulse train being too short to render a proper $V_{SENSE}$ waveform. Timer signal 402 is a free running timer that functions as a lightly loaded spring tension that Bad $V_{SENSE}$ signal 404 works against to keep the $T_{ON\_min}$ near the minimum amount of on-time that results in a suitably undistorted $V_{SENSE}$ waveform. $T_{ON\_min}$ signal 406 indicates how the value of $T_{ON\_min}$ may be adjusted on a switching cycle-by-switching cycle basis according to the exemplary control algorithm. Initially, $T_{ON\_min}$ may be set to a predetermined value, which may be based on an estimated line voltage variation or other suitable system parameter. Alternatively, $T_{ON\_min}$ may be set initially by ramping the value from a low value (e.g., zero) to a value that allows obtaining an undistorted $V_{SENSE}$ waveform (i.e., Bad $V_{SENSE}$ waveform is at logic low). This value of $T_{ON\_min}$ is referred to as T1 in FIG. 3D. For example, controller IC 102 may ramp the value of $T_{ON\_min}$ incrementally (e.g., by a fraction of a clock cycle or an integer number of clock cycles) at a predetermined interval. The predetermined interval, in one example, may be associated with the occurrence of one or more edges of pluses in pulse train. In another example, the predetermined interval may be associated with a predetermined value, which may be based on estimated output power output of power converter 100, estimated line voltage variation or other suitable system parameter.

In cases where the line voltage sags during a switching cycle, T1 may deliver insufficient energy to produce a suitably undistorted $V_{SENSE}$ waveform. In response, Bad $V_{SENSE}$ signal 404 transitions from a low to a high, indicating a distorted $V_{SENSE}$ waveform. The criteria for triggering a Bad $V_{SENSE}$ signal 404 may be determined using a variety of waveform analysis techniques known to those of ordinary skill in the art. For example, a Bad $V_{SENSE}$ signal 404 may transition from a low to a high (i) when the $V_{SENSE}$ pulse is too narrow compared to a threshold value or compliance mask, (ii) when $V_{SENSE}$ waveform rises to a predetermined value too early or falls to a predetermined value too late, (iii) when the $V_{SENSE}$ waveform fails to rise to an expected maximum value, and/or (iv) when the next cycle of $V_{SENSE}$ occurs earlier than expected, etc. When Bad $V_{SENSE}$ signal 404 transitions from a low to a high, the value of $T_{ON\_min}$ increases by $\Delta T$, from T1 to T1+$\Delta T$. Whenever there is an adjustment of the value of $T_{ON\_min}$, Timer 402 is reset to "0" and resumes counting. When Timer 402 reaches a pre-determined threshold, the value of $T_{ON\_MIN}$ is reduced by $\Delta T$, from T1+$\Delta T$ to T1. To provide finer control granularity, $\Delta T$ represents a half-clock cycle of the switching cycle. For example, for a 20 MHz system clock, the clock period would be 50 ns and $\Delta T$ would be 25 ns.

The exemplary dynamic $T_{ON\_min}$ control algorithm operates as follows:
1. At any switching cycle, if Bad $V_{SENSE}$ signal 404 goes high, $T_{ON\_min}$ is increased by $\Delta T$, to T1+$\Delta T$.
2. At any switching cycle, if Timer 402 reaches the pre-set threshold, $T_{ON\_MIN}$ is decreased by $\Delta T$ back to T1.
3. At any switching cycle, if Bad $V_{SENSE}$ signal 404 goes high or if Timer 402 reaches the pre-set threshold, Timer 402 is reset to zero. Otherwise, Timer 402 continues to count.

Accordingly, switching power converter 100 according to the embodiments herein searches for the ideal $T_{ON\_min}$, and then hysterically adjusts $T_{ON\_min}$ between two values with a $\Delta T$ difference.

Figure 3E:
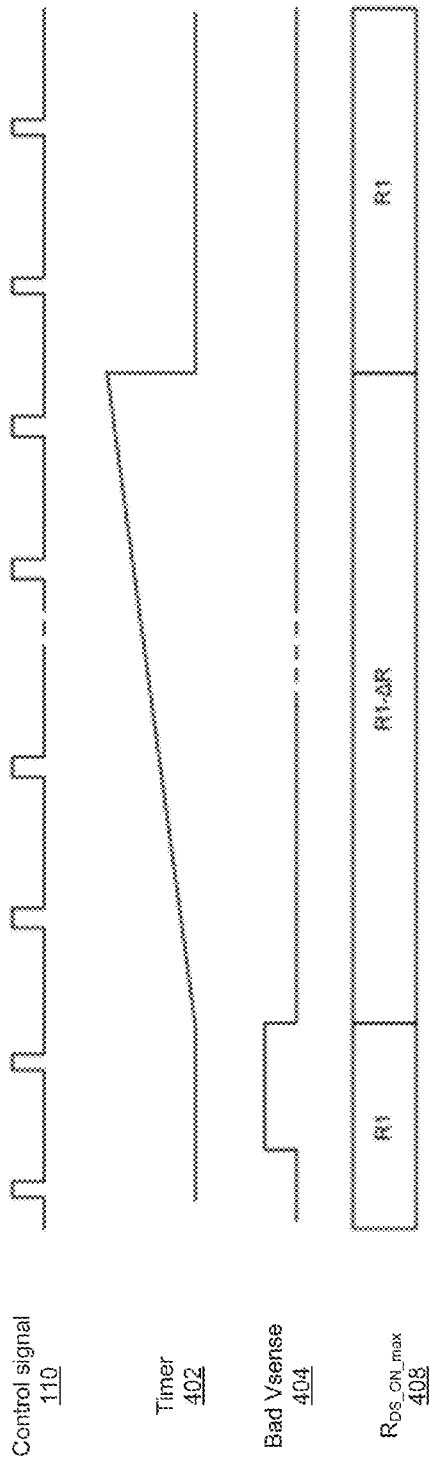
FIG. 3E illustrates how the minimum $R_{DS\_ON\_max}$ is set, according to one embodiment.

FIG. 3E illustrates an exemplary algorithm for dynamic $R_{DS\_ON}$ control. As previously discussed, the actual on-time of the power switch may be reduced by adjusting the gate resistance ($R_{DS\_ON}$) of the power switch if a power MOSFET is used as the power switch. In the $R_{DS\_ON}$ control region of DDPWM mode, the "on" duration of the pulses in the pulse train ($T_{ON}$ time) is fixed at $T_{ON\_min}$ or at a value that is larger than $T_{ON\_min}$ as determined by the dynamic $T_{ON\_min}$ control algorithm described in FIG. 3D. Generally, the exemplary algorithm for dynamic $R_{DS\_ON}$ control operates in a manner similar to the dynamic $T_{ON\_min}$ control algorithm, but instead is used to dynamically adjust the value $R_{DS\_ON}$. $R_{DS\_ON\_max}$ signal 408 indicates how the value of $R_{DS\_ON}$ may be adjusted on a switching cycle-by-switching cycle basis according to the algorithm. Initially, $R_{DS\_ON}$ may be set to a predetermined value (e.g., 50 ohms), which may be based on the type of power transistor used in switching power converter 100 and/or other system parameters. In FIG. 3E, $R_{DS\_ON\_max}$ is set to R1. R1 may be determined in a similar manner to the determination T1 as previously described. When Bad $V_{SENSE}$ signal 404 transitions from a low to a high, indicating a distorted $V_{SENSE}$, the value of $R_{DS\_ON\_max}$ is decreased by $\Delta R$, from R1 to R1-$\Delta R$. The value of $\Delta R$ may be a predetermined value, which may be based on the type of power transistor used in switching power converter 100 and/or other system parameters. In one example, $R_{DS\_ON}$ may be set to 50 ohms, $R_{DS\_ON\_max}$ may be set to 300 ohms, and $\Delta R$ may be set to 20 ohms. In another example, $R_{DS\_ON}$, $R_{DS\_ON\_max}$, and $\Delta R$ may be set to other values suitable to enable controller 102 to dynamically adjust the values of $R_{DS\_ON}$ to maintain an undistorted $V_{SENSE}$ while the "on" duration of the pulses in the pulse train ($T_{ON}$ time) is fixed at $T_{ON\_min}$ or at a value that is larger than $T_{ON\_min}$ as determined by the dynamic $T_{ON\_min}$ control algorithm described in FIG. 3D. Whenever there is an adjustment of the value of $R_{DS\_ON\_max}$, Timer 402 is reset to "0" and resumes counting. When Timer 402 reaches a predetermined threshold, the value of $R_{DS\_ON\_max}$ is increased by $\Delta R$, from R1-$\Delta R$ to R1. The exemplary dynamic $R_{DS\_ON\_max}$ control algorithm operates as follows:

1. At any switching cycle, if Bad $V_{SENSE}$ signal 404 goes high, $R_{DS\_ON\_max}$ is reduced by one step $\Delta R$, to R1-$\Delta R$.
2. At any switching cycle, if Timer 402 reaches the pre-set threshold, $R_{DS\_ON\_max}$ is increased by one step $\Delta R$ back to R1.
3. At any switching cycle, if Bad $V_{SENSE}$ 404 signal goes high or if Timer 402 reaches the pre-set threshold, Timer 402 is reset to zero. Otherwise, Timer 402 continues to count.

The exemplary dynamic $R_{DS\_ON\_max}$ control algorithm is just one way of controlling the power transistor driving strength, i.e., how rapidly the power switch of switching power converter 100 will be turned on. The same concept of dynamic $R_{DS\_ON}$ control and $R_{DS\_ON\_max}$ control can be applied to control the base current (Ib) of a bipolar junction transistor (BJT) power switch as explained above. Applied to a BJT used as the switching device for the switching power converter, another exemplary dynamic minimum base current $Ib_{min}$ control algorithm may operate as follows:

1. At any switching cycle, if the Bad $V_{SENSE}$ signal goes high, $Ib_{min}$ is increased by one step $\Delta I$ from I1 to I1+$\Delta I$.
2. At any switching cycle, if the Timer reaches the pre-set threshold, $Ib_{min}$ is decreased by one step $\Delta I$, back to I1.
3. At any switching cycle, if the Bad $V_{SENSE}$ signal goes high or if the Timer reaches the pre-set threshold, the Timer is reset to zero. Otherwise, the Timer continues to count.

Upon reading this disclosure, those of skill in the art will appreciate still additional alternative designs for switching power converters. For example, although controller IC 102 and its application circuit shown in FIG. 2 are based on the primary-side feedback control, the same principles of this disclosure are also applicable to alternative designs based on the secondary-side feedback control. Thus, while particular embodiments and applications of the present disclosure have been illustrated and described, it is to be understood that the disclosure is not limited to the precise construction and components disclosed herein and that various modifications, changes and variations which will be apparent to those skilled in the art may be made in the arrangement, operation and details of the method and apparatus of the present disclosure disclosed herein without departing from the spirit and scope of the present disclosure.

What is claimed is:

1. A switching power converter comprising:
a transformer including a primary winding coupled to an input voltage and a secondary winding coupled to an output of the switching power converter;
a switch coupled to the primary winding of the transformer, current through the primary winding being generated while the switch is turned on and not being generated while the switch is turned off; and
a controller configured to generate a control signal to turn on or turn off the switch, the switch being turned on responsive to the control signal being in a first state and the switch being turned off responsive to the control signal being in a second state, wherein:
responsive to a current at the output of the switching power converter being greater than a first current level, the controller is further configured to generate the control signal based on a first pulse width modulation mode;
responsive to the current at the output of the switching power converter being less than the first current level but greater than a second current level, the second current level being less than the first current level, the controller is further configured to generate the control signal based on a first pulse frequency modulation mode;
responsive to the current at the output of the switching power converter being less than the second current level but greater than a third current level, the third current level being less than the second current level, the controller is further configured to generate the control signal based on a second pulse width modulation mode;
responsive to the current at the output of the switching power converter being less than the third current level but an input power of the switching power converter being greater than a first power level, the controller is further configured to generate the control signal based on a second pulse frequency modulation mode;
responsive to the input power of the switching power converter being less than the first power level but greater than a second power level, the second power level being less than the first power level, the controller is further configured to generate the control signal based on a third pulse width modulation mode; and
responsive to the input power of the switching power converter being less than the second power level, the controller is further configured to generate the control signal based on a third pulse frequency modulation mode.

2. The switching power converter of claim 1, wherein in the third pulse width modulation mode:
responsive to the input power being less than the first power level but greater than a third power level, the third power level being greater than the second power level but less than the first power level, the controller reduces a duration of the control signal being in the first state as the input power decreases to reduce an actual duration of turn-on of the switch; and
responsive to the input power being less than the third power level but greater than the second power level, the controller reduces a speed at which the switch is turned on as the input power decreases to reduce the actual duration of turn-on of the switch.

3. The switching power converter of claim 2, wherein the switch is a bipolar junction transistor and the controller is further configured to reduce the speed at which the switch is turned on by decreasing a base current (Ib) applied to the switch as the input power decreases to reduce the actual duration of turn-on of the switch.

4. The switching power converter of claim 2, wherein the switch is a metal oxide semiconductor field-effect transistor (MOSFET) and the controller is further configured to reduce the speed at which the switch is turned on by increasing an on-resistance ($R_{DS\_ON}$) of the switch as the input power decreases to reduce the actual duration of turn-on of the switch.

5. The switching power converter of claim 2, wherein responsive to the input power level being greater than the second power level but less than the third power level, the controller is further configured to maintain the duration of the control signal being in the first state at a predetermined value.

6. The switching power converter of claim 5, wherein the controller is further configured to adjust the predetermined value by toggling between a first on-duration value representing the duration of the control signal being in the first state at the third power level and a second on-duration value, the second on-duration value representing the first on-duration value plus a predetermined increment of the switching period.

7. The switching power converter of claim 6, wherein the controller is further configured to adjust the predetermined value from the first on-duration value to the second on-duration value responsive to determining that an output voltage of the switching power converter satisfies a predetermined condition indicative of distortion of a waveform of the output voltage.

8. The switching power converter of claim 7, wherein the controller is configured to:
detect the waveform of the output voltage; and
compare a value of one or more attributes of the waveform of the output voltage to one or more predetermined output voltage waveform threshold values to determine whether the waveform of the output voltage waveform is distorted based on the comparison.

9. The switching power converter of claim 3, wherein the controller is further configured to adjust a value of the base current at the second power level by toggling between a first base current value and a second base current value, the second base current value representing the first base current value minus a predetermined incremental base current value.

10. The switching power converter of claim 9, wherein the controller is further configured to adjust the value of the base current from the first base current value to the second base current value responsive to determining that an output voltage of the switching power converter satisfies a predetermined condition.

11. The switching power converter of claim 4, wherein the controller is further configured to adjust a value of the on-resistance at the second power level by toggling between a first on-resistance value and a second on-resistance value, the second on-resistance value representing the first on-resistance value plus a predetermined incremental on-resistance value.

12. The switching power converter of claim 11, wherein the controller is further configured to adjust the value of the on-resistance from the first on-resistance value to the second on-resistance value responsive to determining that an output voltage of the switching power converter satisfies a predetermined condition.

13. The switching power converter of claim 1, wherein the first current level is fifty percent of a maximum output current level of the switching power converter.

14. The switching power converter of claim 1, wherein the second current level is twenty percent of a maximum output current level of the switching power converter.

15. The switching power converter of claim 1, wherein the third current level is five percent of a maximum output current level of the switching power converter.

16. The switching power converter of claim 1, wherein the first power level is two percent of a maximum input power consumption of the switching power converter.

17. The switching power converter of claim 1, wherein the second power level is one half of one percent of a maximum input power consumption of the switching power converter.

18. The switching power converter of claim 1, wherein the third power level is one percent of a maximum input power consumption of the switching power converter.

19. A method of controlling a switching power converter, the switching power converter including a transformer with a primary winding coupled to an input voltage and a secondary winding coupled to an output of the switching power converter, and a switch coupled to the primary winding of the transformer, current in the primary winding being generated while the switch is turned on and not being generated while the switch is turned off, the method comprising:
generating a control signal to turn on or turn off the switch, the switch being turned on responsive to the control signal being in a first state and the switch being turned off responsive to the control signal being in a second state, wherein:
responsive to a current at the output of the switching power converter being greater than a first current level, generating the control signal based on a first pulse width modulation mode;
responsive to the current at the output of the switching power converter being less than the first current level but greater than a second current level, the second current level being less than the first current level, generating the control signal based on a first pulse frequency modulation mode;
responsive to the current at the output of the switching power converter being less than the second current level but greater than a third current level, the third current level being less than the second current level, generating the control signal based on a second pulse width modulation mode;
responsive to the current at the output of the switching power converter being less than the third current level but an input power of the switching power converter being greater than a first power level, generating the control signal based on a second pulse frequency modulation mode;
responsive to the input power of the switching power converter being less than the first power level but greater than a second power level, the second power level being less than the first power level, generating the control signal based on a third pulse width modulation mode; and
responsive to the input power of the switching power converter being less than the second power level, generating the control signal based on a third pulse frequency modulation mode.

20. The method of claim 19, wherein in the third pulse width modulation mode:
responsive to the input power being less than the first power level but greater than a third power level, the third power level being greater than the second power level but less than the first power level, reducing a duration of the control signal being in the first state as the input power decreases to reduce an actual duration of turn-on of the switch; and responsive to the input power being less than the third power level but greater than the second power level, reducing a speed at which the switch is turned on as the input power decreases to reduce the actual duration of turn-on of the switch.

21. The method of claim 20, wherein the switch is a bipolar junction transistor and further comprising reducing the speed at which the switch is turned on by decreasing a base current (Ib) applied to the switch as the input power decreases to reduce the actual duration of turn-on of the switch.

22. The method of claim 20, wherein the switch is a metal oxide semiconductor field-effect transistor (MOSFET) and further comprising reducing the speed at which the switch is turned on by increasing an on-resistance ($R_{DS\_ON}$) of the switch as the input power decreases to reduce the actual duration of turn-on of the switch.

23. The method of claim 20, wherein responsive to the input power level being greater than the second power level but less than the third power level, maintaining the duration of the control signal being in the first state at a predetermined value.

24. The method of claim 23, further comprising adjusting the predetermined value by toggling between a first on-duration value representing the duration of the control signal being in the first state at the third power level and a second on-duration value, the second on-duration value representing the first on-duration value plus a predetermined increment of the switching period.

25. The method of claim 24, further comprising adjusting the predetermined value from the first on-duration value to the second on-duration value responsive to determining that an output voltage of the switching power converter satisfies a predetermined condition indicative of distortion of a waveform of the output voltage.

26. The method of claim 25, further comprising:
detecting the waveform of the output voltage; and
comparing a value of one or more attributes of the waveform of the output voltage to one or more predetermined output voltage waveform threshold values to determine whether the waveform of the output voltage waveform is distorted based on the comparison.

27. The method of claim 21, further comprising adjusting a value of the base current at the second power level by toggling between a first base current value and a second base current value, the second base current value representing the first base current value minus a predetermined incremental base current value.

28. The method of claim 27, further comprising adjusting the value of the base current from the first base current value to the second base current value responsive to determining that an output voltage of the switching power converter satisfies a predetermined condition.

29. The method of claim 22, further comprising adjusting a value of the on-resistance at the second power level by toggling between a first on-resistance value and a second on-resistance value, the second on-resistance value representing the first on-resistance value plus a predetermined incremental on-resistance value.

30. The method of claim 29, further comprising adjusting the value of the on-resistance from the first on-resistance value to the second on-resistance value responsive to determining that an output voltage of the switching power converter satisfies a predetermined condition.

31. The method of claim 19, wherein the first current level is fifty percent of a maximum output current level of the switching power converter.

32. The method of claim 19, wherein the second current level is twenty percent of a maximum output current level of the switching power converter.

33. The method of claim 19, wherein the third current level is five percent of a maximum output current level of the switching power converter.

34. The method of claim 19, wherein the first power level is two percent of a maximum input power consumption of the switching power converter.

35. The method of claim 19, wherein the second power level is one half of one percent of a maximum input power consumption of the switching power converter.

36. The method of claim 19, wherein the third power level is one percent of a maximum input power consumption of the switching power converter.

* * * * *